Jan. 14, 1964 A. ARBER 3,118,144
LOW POWER MULTI-FREQUENCY COMMUNICATION SYSTEM
Filed Feb. 15, 1961
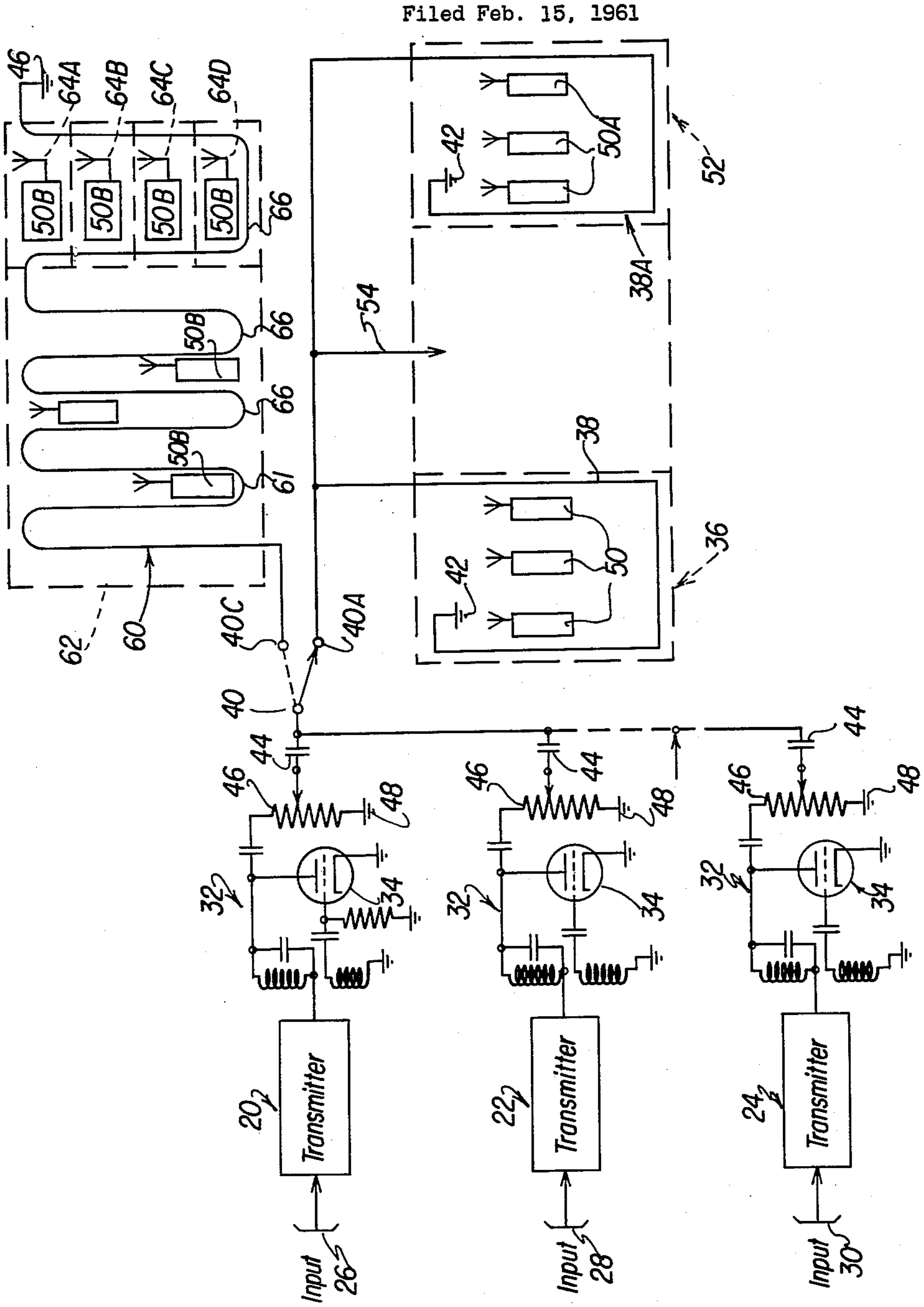
INVENTOR.
Amihadar Arber
BY
Silverman, Mullin & Cass
Attys.

United States Patent Office 3,118,144
Patented Jan. 14, 1964

3,118,144

LOW POWER MULTI-FREQUENCY COMMUNICATION SYSTEM

Amihadar Arber, Skokie, Ill., assignor, by mesne assignments, to Electrotone Laboratories, Inc., a corporation of Illinois Filed Feb. 15, 1961, Ser. No. 89,488
7 Claims. (Cl. 343—200)

This invention relates generally to radio communication systems and more particularly, relates to an improved low-power, relatively low multi-frequency transmission and receiving system especially useful for a confined area such as a hall or room.

Although not necessarily limited thereto, the invention is especially adapted for use in a hall of a museum or gallery or the like, or in a class room whereby simultaneous multi-frequency transmission of either the same or different intelligence can be received in said room or hall by persons provided with radio receivers which selectively can be tuned to any one of the plurality of frequencies at which intelligence is being transmitted. For instance, it would be desirable to transmit a lecture or discussion pertaining to exhibits in the hall of a museum to persons while they are looking at the exhibits. However, it is highly desirable that the lecture should be made available to adults at an adult level of intelligence, to children of different ages at different levels of intelligence, and perhaps in one or more foreign languages so that the lecture can be pitched to various intelligence levels of the greatest number of people likely to visit the hall or room. The system embodying the invention also would be useful for language instruction whereby different lessons and lectures could be transmitted concurrently to be selectively received in the language classes. Another feasible use for the invention would be transmission of the same intelligence concurrently in different languages to be received selectively by persons in the same room or hall. The various intelligence would have to be transmitted at different radio frequencies simultaneously in each instance of use discussed hereinabove.

Previous attempts to provide a multi-channel communication system of the character with which the invention is concerned have been unsatisfactory in many respects. The major problem has been in connection with realizing good radio reception in the hall or room of the concurrent multifrequency radio transmissions. Generally, the practice has been to use a separate antenna feed line or transmission line for each transmitter, the separate line being mounted directly in the hall or room in which the multi-frequency transmission is to be received. Each antenna was selectively matched to the transmitter to which it was connected. Reception of the concurrent multi-frequency transmission in such relatively confined areas was very poor primarily because of undesired radiation in adjacent rooms and interference between adjacent transmitting antennas resulting in cross-talk, especially where the multi-frequency transmission was over a small band of frequencies. Further, reception was poor because of non-uniform distribution of radiation from each antenna due to effect of adjacent walls and/or metal structure. Consequently, more widespread acceptance and use of such multi-frequency communication systems has been discouraged.

The system embodying the invention also eliminates a serious disadvantage of normal radio broadcasting in which radiation from the transmitting antenna is not materially restricted to a confined area but rather is omni-directional and over relatively large distances. The regulations of the Federal Communication Commission do prohibit radio transmission indiscriminately using radio transmitters having a power rating of over one hundred milliwatts. However, even where transmission is by transmitters operating at low power limits, there is a problem of interference with radio transmission of other agencies such as police departments, inter-communication systems between buildings, and transmission into adjacent areas so that the receiver in a particular area will receive undesired frequencies and cross-talk will result. For instance, different transmission over relatively close frequencies into rooms or halls located on different floors of a building using highly radiating antennas, that is, radiating antennas transmitting over relatively large distances, can be received indiscriminately in the rooms on different floors. This problem further discouraged more general use of such communication systems.

Accordingly, it is a major object of the invention to provide a communication system of the character described which will substantially eliminate the disadvantages herein above enumerated.

Another object of the invention is to provide a multi-frequency communication system of the character described which includes, a plurality of low power transmitters and a single transmitting antenna line connected directly to the output of each transmitter in an electro-magnetically closed loop, said antenna line being of a random length and unmatched to the various transmitter outputs.

Another object of the invention is to provide a multi-frequency transmission system of the character described which employs a plurality of low powered transmitters adapted to transmit radio intelligence concurrently over a band of frequencies and a closed loop, single line transmitting antenna connected at one end thereof to each of the transmitters, the opposite end being arranged relative to ground to create an elecro-magnetically closed circuit.

Another important object of the invention is to provide a multi-channel communication system of the character described in which the radiation from the transmitting antenna is substantially localized within a volume of space in close proximity to the radiating antenna without realizing long distance electro-magnetic radiation.

Further objects of the invention are to provide a low power radio transmission system of the character described in which a plurality of frequencies may be transmitted simultaneously and selectively received at a common location and/or another location relatively close to said common location which is characterized by a substantially greater degree of efficiency than has heretofore been realized; which is highly economical and simple to install and use; which is highly versatile in the number of different uses to which the system may be put; and which enables a greater number of transmitters to be coupled to the common single transmission line without reducing the efficiency of the communication system to any material degree, and without resulting deleterious cross-talk.

The foregoing and other objects of the invention will become apparent from the ensuing description in which preferred embodiments and adaptations have been described in detail and illustrated diagrammatically in the accompanying drawing. Minor variations in the component parts of the invention and the manner in which they are connected in circuit one with the other may occur to the skilled artisan without departing from the scope or sacrificing any of the advantages of the invention.

Generally, the invention contemplates the use of a battery of low-powered transmitters feeding a common, single radiating line or antenna. The single line is of a random length and purposely unmatched to the output of the transmitters. Each transmitter is operated at a different frequency over a relatively narrow band of frequencies such that adjacent frequencies of the band are very close, perhaps approximately 50 kilocycles apart. The single antenna line is connected in an electro-magnetically closed loop directly to the output of each of the transmitters with intentional impedance mis-matching. As a result of such intentional use of a single radiating line of random length common to all of the transmitters and loose coupling thereof directly to the output of said transmitters without impedance matching of the line to said outputs, standing waves are created along the antenna and said standing waves are utilized to provide a highly concentrated radiation pattern capable of being selectively received only in close proximity to the said radiating line and without realizing long range electro-magnetic radiation. Such long distance radiation would result in undesirable interference with radio reception at a location not too remote from the radiating antenna line. This condition enables further the same frequency at which one transmitter is operating to be used for transmission by a second transmitter to a second location relatively close to the first location. For instance, a single frequency but transmitting different intelligence can be used for reception at a location on the first and third floor of a building without resulting interference and/or cross talk reception. Of course, a separate single transmitting or radiating line would be connected to each of the transmitters transmitting at the same frequency and each line would be located in one of said locations.

Referring now to the drawing, several alternative transmitting antenna installations which can be employed in utilizing the principles of the invention are illustrated and which may be mutually exclusive or in certain instances, used jointly. A plurality of like radio transmitters 20, 22, and 24, are illustrated, the number of which may be more or less than the three shown in the drawing. Each of said transmitters is of a low power type and is adapted to be fed from an independent input source indicated respectively at 26, 28 and 30. The input sources may vary from any one of a plurality of different types such as a conventional microphone, a phonograph record, a magnetic tape, among others. The input sources 26, 28 and 30 conveniently can be located adjacent the transmitters 20, 22 and 24, although this may not be absolutely necessary. Each of the radio transmitters 20, 22 and 24 feeds a common radiating or transmitting line by means of its respective output circuit 32 which has been represented to include the electronic valve 34 together with its attendant circuitry.

The reference character 36 designates generally a single confined area such as a hall or room and in which the various intelligence transmitted concurrently at different frequencies by the radio transmitters 20, 22 and 24 are to be received. The common radiating line is designated generally 38 and comprises a single length of stranded wire installed in the room 36. For convenience, the radiating line 38 is installed on the ceiling of the room and preferably around the perimeter of the ceiling so as to form a loop substantially overlying the area subtended by said ceiling. One end of the radiating line 38 is connected to a common terminal 40 and each of the outputs of the amplifiers 32 likewise is connected to said terminal 40. The opposite end of the radiating line is grounded as indicated at 42. The ground connection of the antenna may be either a direct connection or an indirect connection since the important consideration is to establish an electro-magnetic connection of the antenna to ground so that the radiating line forms an electro-magnetically closed loop in the receiving area 36. The length of the radiating line is randomly selected since it has no relationship electrically with respect to the output of the transmitter to which it is connected. Each of the outputs 34 of the amplifiers 32 is connected to said common terminal 40 through a very small condenser 44 in order to form a loose coupling and a variable resistance 46 which may comprise a potentiometer, for instance. The potentiometer 46, in each instance, is grounded, as indicated at 48.

It will be appreciated that the loose coupling of the output of each transmitter to the radiating line 38 and the random length of said line 38 arranged relative to the output of each transmitter in an electro-magnetically closed loop with intentional impedance mismatching results in standing waves along the radiating line. There results a highly concentrated radiation pattern in close proximity to said line and capable of being selectively received by receiver 50 located in the room 36 without realizing long distance electro-magnetic radiation. The highly localized and strong radiation pattern of the transmission line 38 can be received without resulting cross-talk.

The communication system embodying the invention was practiced with marked success using low power transmitters of conventional and readily available construction. The room 36 was approximately 20,000 square feet in floor area. The condensers 44 were of the conventional mica type rated at from 2 to 5 picofarads and potentiometer 46 was used to control the intensity of the radiated signal for optimum values. The transmitters 20, 22 and 24 were operated within a range of 1.7 to 2.3 megacycles with adjacent frequencies differing by approximately 50 kilocycles. Excellent reception was received with the conventional receivers 50, each receiver being tuned to select and discriminate clearly against any other frequencies at which energy was radiated from the radiating line 38. No cross-talk was encountered and discrimination between the various frequencies of transmission notwithstanding the relatively small band employed, was excellent. At locations approximately 100 feet from the transmitting line, no reception was possible due to the highly localized character of the radiation from the line 38.

Referring to the lower right hand portion of the figure wherein an alternate arrangement embodying the invention is shown, the reference character 52 designates generally a second room or location separated from the room or hall 38 by the intervening space indicated diagrammatically at 54 The invention contemplates that a second antenna 38A substantially similar to the transmission line 38 can be located in the room 52 and arranged in an electro-magnetically closed loop. The input end of the antenna 38A can be connected to the common terminal 40 with its opposite end arranged relative to ground 42 to form the electro-magnetically closed loop. The receivers 50A in room 52 can receive the same intelligence transmitted by the transmitters 20, 22 and 24 simultaneously as the receivers 50 in room 38. This arrangement permits the same battery of transmitters to be used to transmit to different locations of a building with the transmitters located at a central station in the building.

On the other hand, the radiating antenna line 38A can be connected to a common terminal 40A to which the outputs of a second battery of transmitters can be connected. Because of the highly localized pattern of radiation of the antennas 38 and 38A, the receivers 50A in the room 52 can readily discriminate between the transmission of the several batteries of transmitters. Likewise, the antenna 38 is also highly discriminatory relative the transmission of the various batteries of transmitters. Thus, the separate batteries of transmitters can be used to transmit intelligence on the same frequencies into the separate rooms 36 and 52 without concern for cross-talk and/or other interference which would adversely affect the receivers 50 or 50A in discriminating between the various radio transmissions.

Referring to the upper portion of the figure, there is illustrated still another alternative system employing a radiating line designated generally 60 which can be located for radiating energy to a single large building represented by the reference character 62. The building 62 would be a single story edifice, for instance, the roof of which is subtended by separate rooms or halls such as designated 64A, 64B, 64C and 64D for illustrative purposes. Thus several rooms can be seen to be arranged in rows transverse and along the length of the building. Conveniently, the radiating line 60 could be installed on the ceiling of the building with one end thereof connected to the common terminal 40C. The opposite end of the antenna would be arranged relative to ground 42 to form the radiating line into an electro-magnetically closed loop. The antenna line 60 comprises a single random-length wire which is folded intermediate its ends to provide a series of loops 66 extending across the underside of the roof. Each of the loops 60 is located to extend over a bank of rooms such as 64A, 64B, 64C and 64D so as to provide the desired highly localized radiation pattern for each bank of rooms. Receivers 50B can be provided in each room as desired. It will be appreciated that the arrangement of the antenna line 60 would also be suitable for a multiple story building on separate floors thereof located outside the range of the radiation from the antenna.

It is believed that the invention has been described in sufficient detail to enable the efficient and thorough practice and understanding of the invention. Because of the highly concentrated radiation pattern of the radiating line employed in practicing the invention, there is no concern with relatively long distance electro-magnetic radiation which conceivably could interfere with reception by other agencies or communication systems outside the range of the radiation pattern. For instance, there would be no concern with interference with radio communication systems used by law enforcement agencies or other administrative bodies. Further, the invention contemplates making it possible to use a larger number of transmitters in the relatively confined areas involved because the same frequency of transmission can be used for a radio transmitter in any one of several batteries of transmitters.

The invention has been particularized in the claims hereto appended in language intended to be broadly and liberally construed.

I claim:

1. For use in a multi-frequency radio communication system for simultaneously transmitting intelligence at different radio frequencies to be received concurrently in a confined location: a plurality of low-power radio transmitters each having the output thereof connected to a common terminal, a single radiating line of random length installed at said location with one end thereof coupled conductively to said terminal and the other end thereof arranged relative to ground to form an electro-magnetically closed radiating loop in said location, and electrical means connected between each transmitter and the common terminal producing impedance mismatching of the radiating line with each of the transmitter outputs.

2. For use in a multi-frequency radio communication system wherein intelligence is transmitted simultaneously at different radio frequencies to be selectively received concurrently in a room or the like; a plurality of low-power transmitters arranged to transmit intelligence over a range of different frequencies concurrently, a common transmitting line of random length loosely coupled conductively directly to the output of each of said transmitters and arranged relative to ground in an electro-magnetically closed loop in said room or the like, each transmitter having variable impedance means connected between the output thereof and said transmitting line providing impedance mis-matching of the line to each of said outputs whereby a localized radiation pattern for said line is achieved in said room or the like.

3. The structure as described in claim 2 and in which said variable impedance means comprises a condenser.

4. The structure as described in claim 2 and in which the outputs of the transmitters and one end of said line are connected to a common terminal.

5. The structure as described in claim 4 and in which there is a second like transmitting line connected at one end thereof to said common terminal.

6. The structure as described in claim 4 and in which there is a second group of radio transmitters connected in a like manner to a second common terminal and a second like transmitting line connected in a like manner to said second common terminal, said transmitting lines being installed in a like manner in separated rooms or the like in relatively close proximity one relative to other.

7. The structure as described in claim 1 and in which the transmitting line is supported on the ceiling of the room or the like in a loop configuration extending substantially around the perimeter of the ceiling.

References Cited in the file of this patent

UNITED STATES PATENTS

| | | |
|---|---|---|
| 2,419,833 | Grimes | Apr. 29, 1947 |
| 2,567,431 | Halstead | Sept. 11, 1951 |

FOREIGN PATENTS

| | | |
|---|---|---|
| 764,295 | France | May 17, 1934 |